United States Patent [19]
Zaviska

[11] Patent Number: 6,102,495
[45] Date of Patent: Aug. 15, 2000

[54] HYDRAULIC UNIT FOR SLIP-CONTROLLED BRAKE SYSTEMS

[75] Inventor: Dalibor Zaviska, Eschborn, Germany

[73] Assignee: ITT Automotive Europe GmbH, Frankfurt, Germany

[21] Appl. No.: 09/303,588

[22] Filed: May 3, 1999

Related U.S. Application Data

[63] Continuation of application No. 08/748,019, Nov. 12, 1996, Pat. No. 5,975,653, which is a continuation of application No. 08/416,689, Apr. 10, 1995, Pat. No. 5,577,813.

[30] Foreign Application Priority Data

| Oct. 9, 1992 | [DE] | Germany | 42 34 013 |
| Feb. 27, 1993 | [DE] | Germany | 43 06 222 |

[51] Int. Cl.$^7$ .................................................. B60T 15/00
[52] U.S. Cl. ................................ 303/116.4; 303/119.3; 303/DIG. 10
[58] Field of Search ............................ 303/116.1, 116.2, 303/116.4, 113.1, 119.2, 119.3, DIG. 10

[56] References Cited

U.S. PATENT DOCUMENTS

| 4,633,759 | 1/1987 | Schulze | 303/116.4 |
| 5,022,717 | 6/1991 | Heibel et al. | 303/116.4 |
| 5,035,469 | 7/1991 | Geilen et al. | 303/116.4 |
| 5,172,956 | 12/1992 | Klose et al. | 303/116.4 |
| 5,244,262 | 9/1993 | Kehl et al. | 303/116.4 |
| 5,362,141 | 11/1994 | Beck et al. | 303/119.3 |
| 5,449,226 | 9/1995 | Fujita et al. | 303/119.3 |
| 5,466,055 | 11/1995 | Schmitt et al. | 363/119.3 |

FOREIGN PATENT DOCUMENTS

| 0 358 127 | 3/1990 | European Pat. Off. . |
| 0 373 551 | 6/1990 | European Pat. Off. . |
| 0 478 933 | 4/1992 | European Pat. Off. . |
| 2 673 585 | 9/1992 | France . |
| 2 745 155 | 4/1978 | Germany . |
| 3 618 835 | 12/1987 | Germany . |
| 3 816 748 | 11/1989 | Germany . |
| 8 815 426 | 5/1990 | Germany . |
| 8 815 427 | 5/1990 | Germany . |
| 4 001 373 | 7/1990 | Germany . |
| 3 929 009 | 3/1991 | Germany . |
| 4 013 160 | 10/1991 | Germany . |
| 4 013 481 | 10/1991 | Germany . |
| 4 016 754 | 11/1991 | Germany . |
| 4 018 179 | 12/1991 | Germany . |
| 4 107 625 | 9/1992 | Germany . |
| 2 128 168 | 12/1992 | Germany . |
| 4 118 834 | 12/1992 | Germany . |
| 4 202 905 | 8/1993 | Germany . |
| 4 212 663 | 8/1992 | Japan . |
| 2 161 231 | 1/1986 | United Kingdom . |
| 2 257 216 | 1/1993 | United Kingdom . |
| 9 011 212 | 10/1990 | WIPO . |
| 9 116 220 | 10/1991 | WIPO . |
| WO 91/16221 | 10/1991 | WIPO . |
| WO 93/08050 | 4/1993 | WIPO . |

Primary Examiner—Matthew C. Graham
Attorney, Agent, or Firm—Ratner & Prestia

[57] ABSTRACT

A compact hydraulic unit for slip-controlled brake systems with several hydraulically, mechanically and/or electrically operable functional elements (e.g. accumulator, valve elements, pressure generating and driving elements) arranged in an accommodating member, with several pressure fluid channels connecting the functional elements. The pressure fluid channels create a hydraulically operable connection between at least one pressure fluid supply means and one pressure fluid consumer. A control device can be connected with the valve and the driving elements by means of electrical conductors. The valve elements are arranged in several valve accommodating bores of the valve accommodating member in a first and a second row. Pressure fluid bores are provided between the two diametrically extending valve rows which connect the valve elements and location bores containing the pressure generating element and the driving element. Outside the two valve rows, there are further location bores in the valve accommodating member in which pressure accumulator pistons are positioned.

15 Claims, 5 Drawing Sheets

HYDRAULIC UNIT FOR SLIP-CONTROLLED BRAKE SYSTEMS

This application is a continuation of U.S. patent application Ser. No. 08/748,019, filed Nov. 12, 1996 now U.S. Pat. No. 5,975,653, which is a continuation of U.S. patent application Ser. No. 08/416,689, filed Apr. 10, 1995 now U.S. Pat. No. 5,577,813.

This application is the U.S. national-phase application of PCT International Application No. PCT/EP93/02543.

BACKGROUND OF THE INVENTION

The present invention relates to a hydraulic unit for slip-controlled brake systems.

The German patent application P 41 07 625.7 discloses a hydraulic unit for slip-controlled brake systems for automotive vehicles, the valve accommodating member of which is directly flanged to a central housing containing the accumulator and pressure generating and driving elements. These functional elements are arranged in location bores which are distributed over the central housing so that, among other things, a number of working positions have to be considered in the work program of the automatic machine tool during the production of the complicated central housing and the valve accommodating member which has to be manufactured separately in the machining center. Besides, the size of the hydraulic unit cannot be reduced due to the described structure, so that the mounting position or the mounting place is more difficult to select.

SUMMARY OF THE INVENTION

An object of the present invention is, therefore, to create a hydraulic unit of a compact size which can be produced precisely, at low cost and in a simple way.

According to the present invention, this object is achieved by a valve accommodating member which accommodates the accumulator, valve, and pressure generating and driving elements in such a way that the pressure generating and driving elements can be arranged between the two valve rows spaced from each other, with the housing material of the valve accommodating member projecting laterally relative to the valve rows and used for accommodating the accumulator elements.

The embodiments of the present invention will be described in more detail with reference to the drawings.

DETAILED DESCRIPTION OF THE INVENTION

Figure 1:
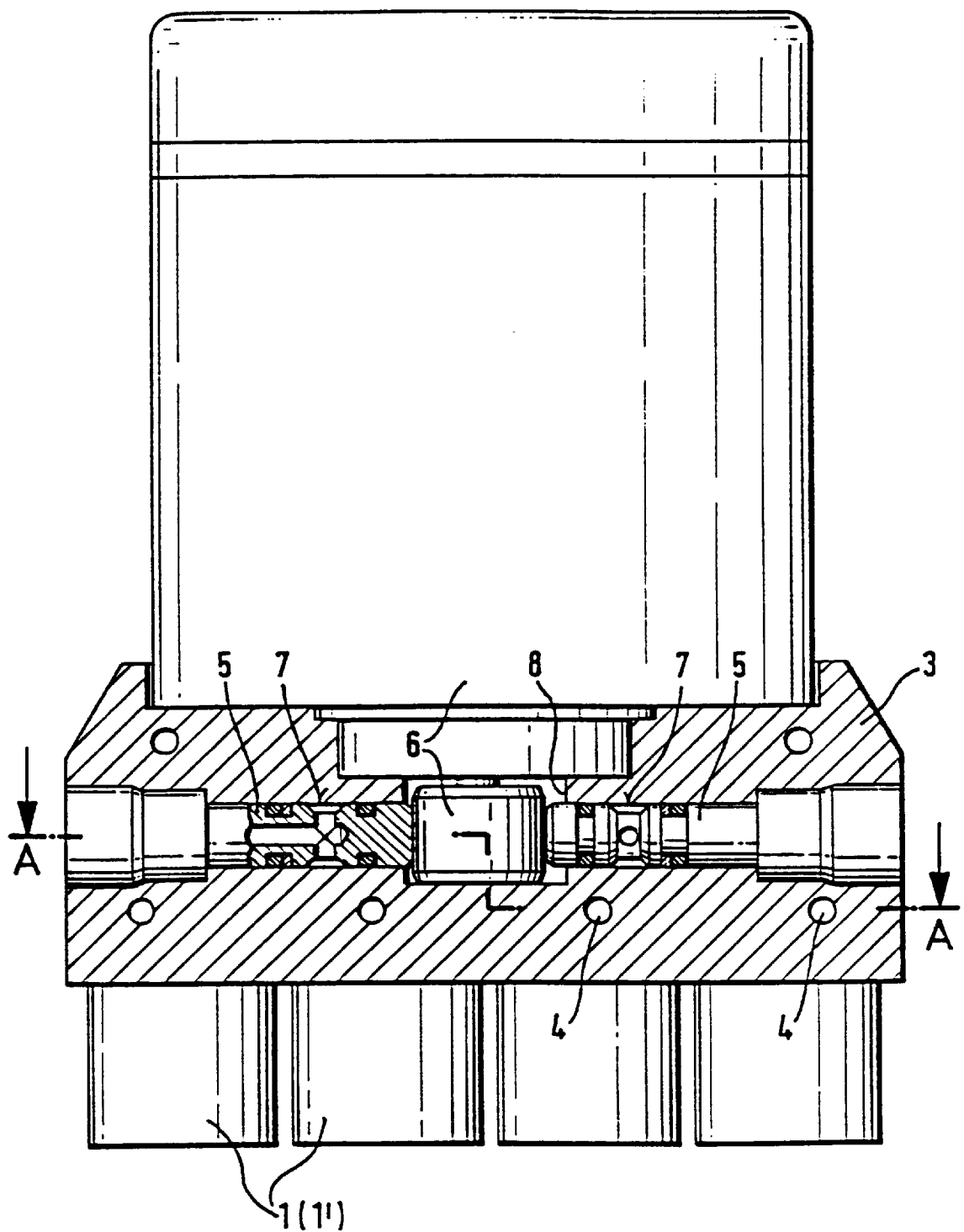
FIG. 1 is a top view of the hydraulic unit.

FIG. 1 shows the basic arrangement of the valve elements 1, 1', pressure generating element 5, and driving elements 6 in the valve accommodating member 3. The location bore 8 which accommodates the driving elements 6 consisting of an electric motor and an eccentric drive and the valve elements 1, 1' are oriented parallel to the valve axis. For this reason, the location bore 7 of the pressure generating element 5, consisting of a double-flow radial piston pump, extends transversely to the axis of the electric motor and the valve axis. The pressure generating element 5 is, therefore, arranged between the connection planes of the valve elements 1, 1' and the electric motor.

Figure 2:
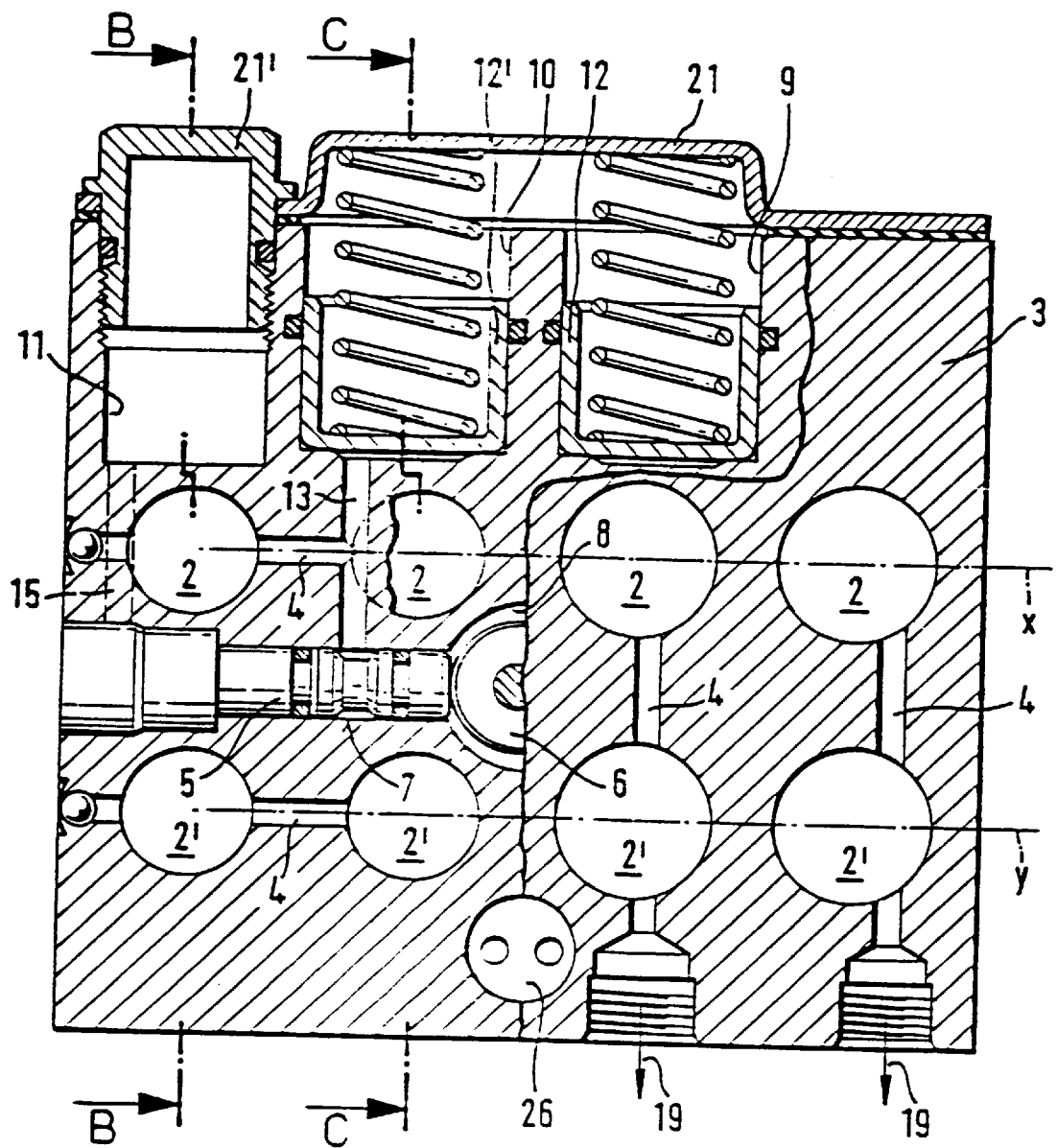
FIG. 2 is a cross-sectional view of the hydraulic unit taken along line A—A of FIG. 1.

FIG. 2 shows a cross-section through the valve accommodating member 3 taken along line A—A of FIG. 1. The valve accommodating member 3 has an essentially square block form, in which are arranged the two parallel rows of valve accommodating bores 2, 2'. The location bore 7 for the pressure generating element 5 is arranged between the two valve rows x, y and extends parallel to their axes. The location bores 9, 10 which accommodate the pressure accumulator piston 12, 12' acting as part of the accumulator elements are arranged perpendicularly to the valve accommodating bores 2, 2' outside the two valve rows x, y. The bores for the pressure fluid 4, 13 connect the valve accommodating bores 2 of the electromagnetically closed valve elements 1, 1', acting as outlet valves in their normal position, with the location bores 9, 10 of the accumulator elements. Another location bore 11, arranged at the side of and parallel to the location bores 9, 10 of the accumulator elements, is connected with the pump section on the delivery side of the location bore 7 by means of a pressure fluid bore 15. In this way, hydraulic pressure peaks of the pressure generating elements provide for a damping of the pump noise in the associated location bore 11. The location bore 11 is integrated either by means of a separate cover or by means of the deep drawn cap-type cover 21 of the location bores 9, 10. In the embodiment of the present invention shown in FIG. 2, the separate cover 21', configured as screw coupling, serves also for clamping and pressing the cover 21 which closes the two location bores 9, 10, so that clamping devices for cover 21 are not necessary. Valve row x facing the accumulator elements accommodates exclusively the valve elements (outlet valves) which, in their normal position, are electromagnetically closed. The second valve row y accommodates the valve elements (inlet valves) which, in their normal position, are electromagnetically opened. This results in the channel guiding, indicated in the FIG. 2, by which the pressure fluid consumer 19 is connected, respectively, with the valve accommodating bores 2, 2' of the inlet and outlet valves by means of the pressure fluid bores 4. Among other things, the bores in the valve accommodating member 3 serve also for arranging the cable bushing 26 for the electric motor directly in the valve accommodating member 3.

Figure 3:
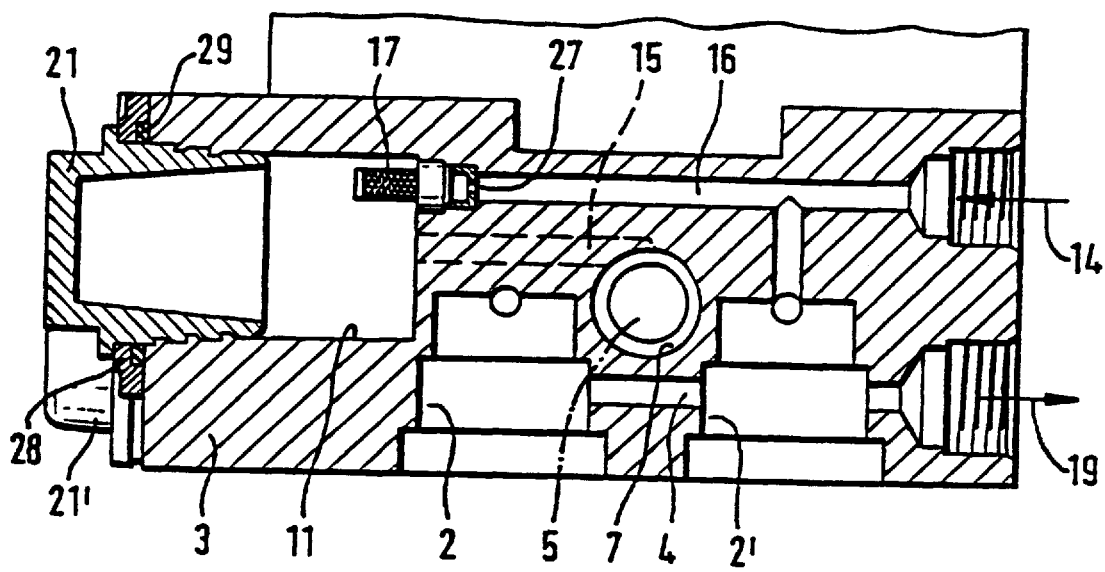
FIG. 3 is a cross-sectional view of the hydraulic unit taken along line B—B of FIG. 2.

FIG. 3 shows a vertical section taken along line B—B of FIG. 2, rotated in the drawing plane, which illustrates the channel guiding and the shape of the location bores 2, 2', 11. By means of a pressure fluid bore 4, the valve accommodating bores 2, 2' are connected with the pressure fluid consumer 19 (wheel brake). At the bottom of the housing, the valve accommodating bore 2' is provided with a further channel branch which leads into the channel 16 connecting the location bore 11 with the pressure fluid supply means 14. To provide an unhindered venting of the location bore 11, channel 16 is positioned as near as possible to the outer edge and thus in an elevated position relative to the location bore 11. A filter element 17, inserted at the point where the mouth of the channel 16 leads into the location bore 11, acting as damping chamber prevents the ingress of dirt particles into the bore of the restrictor 27 which is also arranged in channel 16. Cover 21', which in FIG. 2 is illustrated as a screw coupling, is provided, as shown in the cross-sectional view of FIG. 3, on the one hand, with a self-tapping outside surface and, on the other hand, with a conical inside surface which increases in diameter along the direction extending into the valve accommodating member 3. During the pressing operation, the harder material of cover 21' causes the softer material of the valve accommodating member 3 (e.g. aluminium) to yield into the circumferential grooves projecting like noses from cover 21' thus creating a tight and impermeable fit of cover 21'. The conically enlarged portion of the cover 21' permits the escape of air inclusions from the location bore 11. Since the cover 21' closing the location bore 11 also serves to clamp, in a sealing manner, the second deep drawn cover 21 formed like a cap, an intermediate sealing plate 29, preferably made of cellular rubber, is positioned between the two covers. On its contact surface, the deep drawn cover 21 is provided with projections 28 which prevent the sealing plate 29 from being squeezed and thus damaged due to the space resulting from it. The location bore 7 for the pressure generating element 5 is positioned in a compact manner in the valve accommodating member 3, surrounded by the channel 16, the pressure fluid bore 4 and the valve accommodating bores 2, 2', so that the other pressure fluid bore 15, which normally can only be seen in a cross-section before the present drawing plane, creates an unhindered hydraulic connection with the location bore 11.

Figure 4:
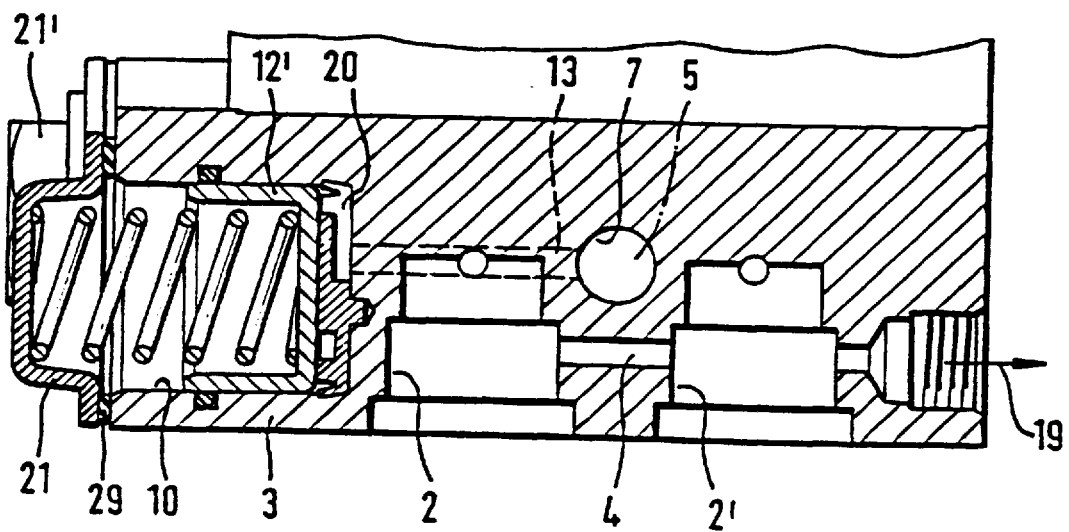
FIG. 4 is a cross-sectional view of the hydraulic unit taken along line C—C of FIG. 2.

FIG. 4 is a cross-section view taken along line C—C of FIG. 2 which illustrates, as a lateral view, the connection of the pressure fluid bore 13 for the pressure generating element 5 in location bore 7 on the suction side. A deviation device 20, having an essentially disc-shaped design, is fastened between the pressure accumulator piston 12' and the associated mouth of the pressure fluid bore 13 in order to allow an unhindered venting of the location bore 10 containing the pressure accumulator piston 12' and provides for a deviation of the pressure fluid column by means of a partial opening of its housing which extends towards the upper side in the venting direction. The deviation device 20 is protected against a change of its position by means of a guiding pin and is fastened in a frictionally or positively engaged way.

Figure 5:
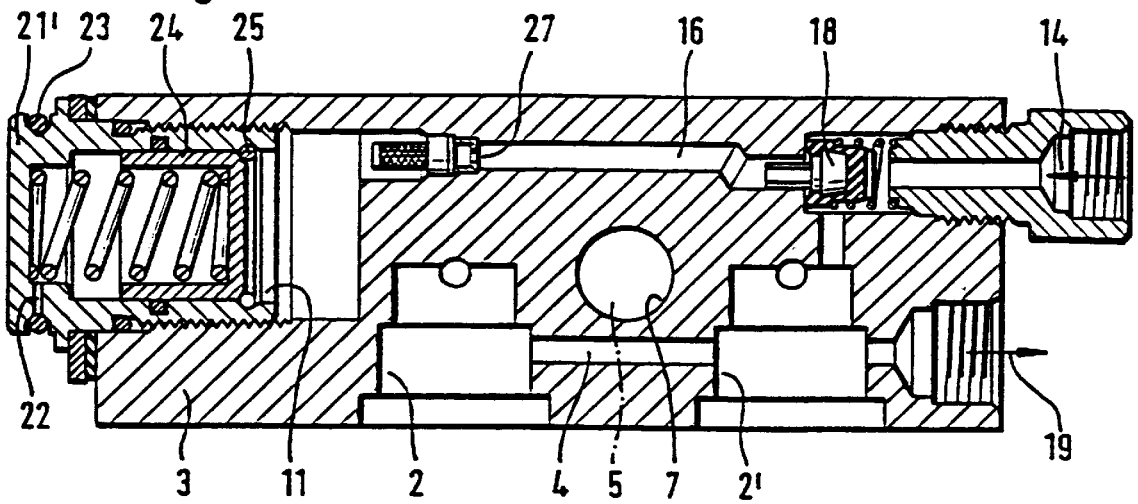
FIG. 5 is a sectional view of an alternative embodiment presenting the location bore forming the damping chamber and its hydraulic connection.

In FIG. 5, the location bore 11, which absorbs the fluid volume, has a spring loaded damping piston 24 corresponding to the accumulator elements described above. The damping piston 24 is guided, in a sealed manner, in the sleeve-shaped shaft of cover 21', to which, in the normal position of the piston, spring force is applied and which, therefore, abuts on a circlip 25 inserted in the shaft of cover 21'. In order to vent and discharge the pressure leakage, the edge of the cover is provided with a leakage and pressure relief bore 22 which is normally closed by means of a sealing ring 23 on the circumference of the cover edge. Since the location bore 11 absorbs variable quantities of fluid volume by means of damping piston 24, channel 16 is provided with a non-return valve 18 acting in the direction of the damping piston 24, which prevents an undesired accumulation of fluid volume when the brake pedal is actuated. The supply of pressure fluid to the wheel brake, through the inlet valve inserted in the valve location bore 2', remains unaffected by the operating position of the non-return valve 18. The pressure fluid volume, which is temporarily accumulated in the location bore 11 by damping piston 24, prevents a resetting movement of the working pistons during the pump operation which could damage the collars of the main cylinder.

Figure 6:
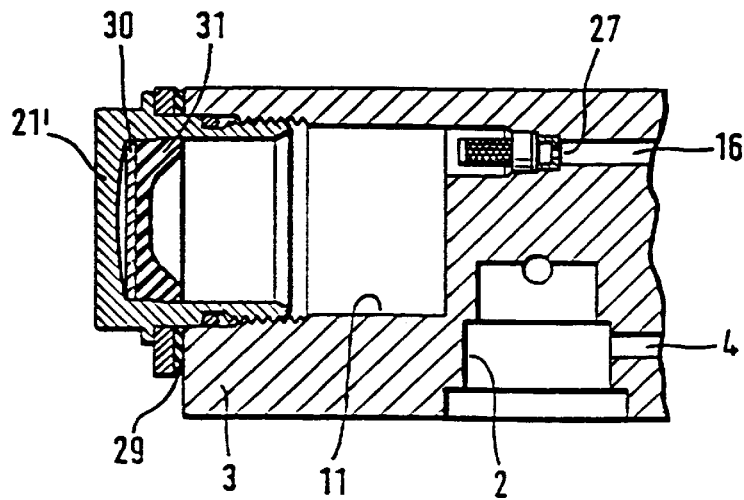
FIG. 6 is a sectional view of another embodiment of the damping chamber.

In a further embodiment of the present invention, the configuration of the location bore 11, acting as damping chamber (see FIGS. 2, 3 and 5), provides for combining the effects of a reflection damper with those of an accumulator damper. This is illustrated in FIG. 6 in which the cover that closes location bore 11 is formed as accumulator damper by means of a serial arrangement of a diaphragm 30 and a cup-type collar 31 while the reflection damping is obtained combining the effects of temporarily accumulated pressure fluid volumes by means of a restrictor 27.

The following is a summary of the functioning of the hydraulic unit described in FIGS. 1 to 6 for a wheel brake circuit of a slip-controlled brake system for automotive vehicles.

The delivery of pressure fluid to the hydraulic unit takes place by actuating the main cylinder (pressure fluid supply means 14) so that the pressure fluid arrives at the valve accommodating bore 2', including the inlet is valve, and, therefore, at the wheel brake (pressure fluid consumer 19). The pressure fluid bore 4 connecting the inlet valve with the outlet valve is also under pedal force proportional pressure while the outlet valve blocks the pressure fluid bore 13 leading to the pressure accumulator piston 21. At the beginning of the slip control of the brake, the electric motor (driving element 6) drives the radial piston pump (pressure generating element 5) so that the pressure fluid volume drawn from the accumulating element (location bore 9, 10) is delivered to the noise damping chamber (location bore 11) by means of the pressure fluid bore 13 in order to act on the tandem-type main cylinder (pressure medium supply means 14) through restrictor 27 in the channel 16, the pressure modulation being obtained by means of the valve accommodating bores 2, 2' depending on the electromagnetic operation of the inlet and outlet valves (valve elements 1, 1') in each respectively associated wheel brake (pressure fluid consumer 19).

Figure 7:
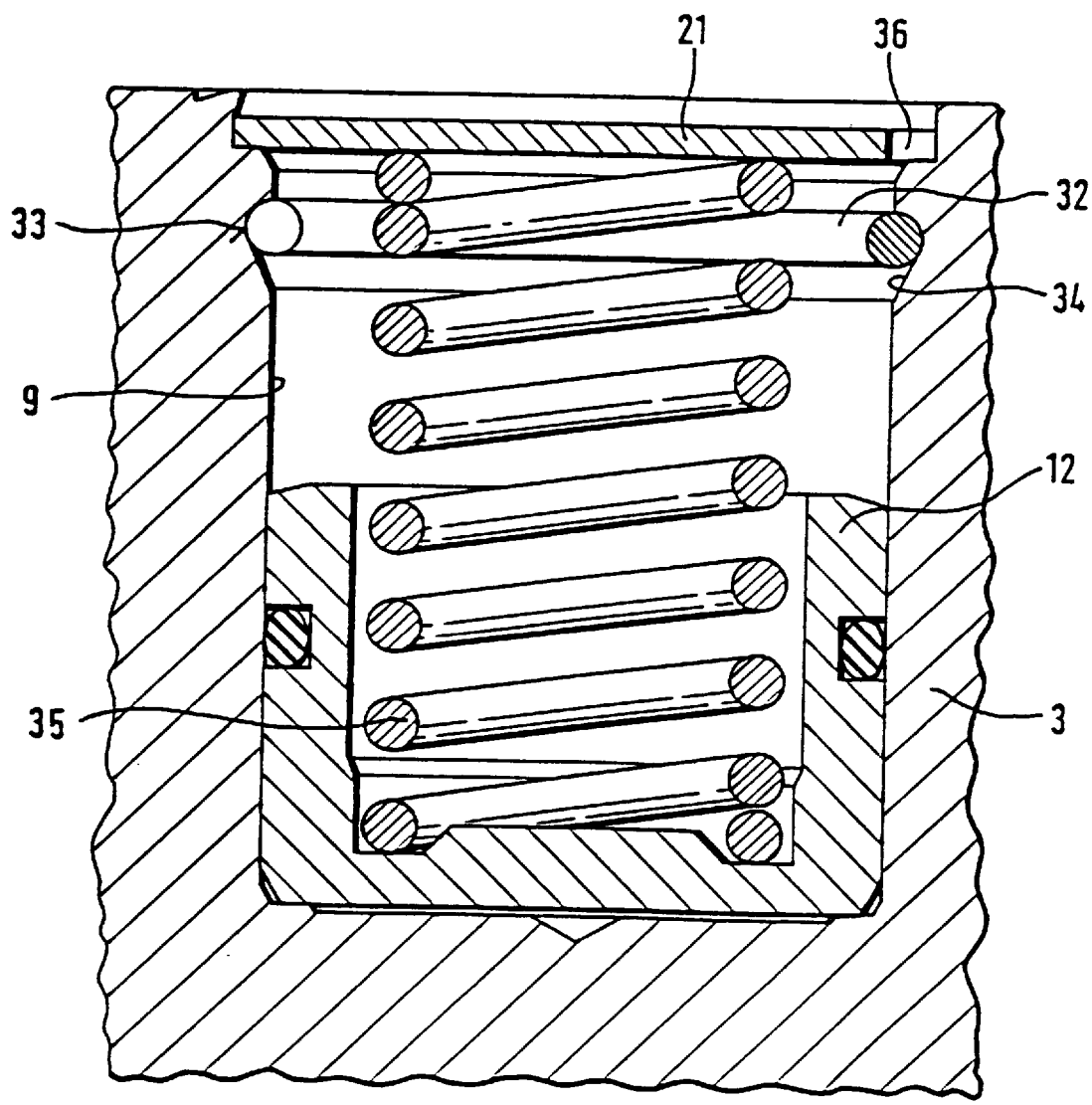
FIG. 7 is a sectional view of the location bore including the pressure accumulator piston.

FIG. 7 shows, in a cross-sectional view, a portion of the valve accommodating member 3, i.e. the area of a location bore 9, which accommodates the pressure accumulator piston 12, the stop portion 32 and the cover 21. According to the present invention, the stop portion 32 is inserted into the location bore 9 in a recess 33 formed as circlip groove, the location bore 9 being provided with a lifting slope 34 in order to dismount the stop portion 32 formed as circlip or wire ring. The lifting slope is a conically enlarged portion of the nominal diameter of the location bore 9 and becomes the outer diameter of the circlip groove. The front part of the pressure accumulator piston 12, configured as cup-formed deep drawn part, is circumferentially chamfered towards the outside in such a way that a favorable force introduction into the circlip groove 33 can be achieved when the pressure accumulator piston 12, being under high pressure (max. pressure approx. 350 bar), strikes the stop portion 32. By means of this force deviation into the wall of the location bore 9, the cover 21, closing the location bore 9, is free from hydraulic forces so that it has to absorb only the supporting force (spring force approx. 100 Newton) of the pressure spring 35. Cover 21 can, therefore, be designed as an extremely thin-walled metal or plastic disc which closes positively and/or frictionally engaging the location bore 9. FIG. 7 shows an example of a circlip groove for the accommodation of the stop portion 32. Due to the simple and space-saving fastening of the stop portion 32 in the location bore 9, it is possible to arrange several grooves, one after the other, in the location bore 9 in order to set different accumulation volumes so that an axial displacement of the stop portion 32 can be obtained according to the necessity.

The object of the present invention permits a particularly short construction of the pressure accumulator, reducing at the same time cost and weight without presenting disadvantages. With regard to the ventilation and venting of the pressure accumulator, the edge of cover 21 is provided with an opening 36 which can be equipped with a weatherproof protection, if necessary. The chamfering 34, oriented towards the location bore 9, permits the mounting of the pressure accumulator piston 12 and the dismounting of the stop portion 32 in the location bore 9. This chamfering 34 prevents the sealing element, arranged in the circlip groove on the pressure accumulator piston 12, from being damaged during the insertion of the piston. Furthermore, the stop portion 32 can be removed far more easily because the chamfering 34 acts as a lifting slope to dismount the pressure accumulator.

List of reference numerals

| | |
|---|---|
| 1, 1' | valve elements |
| 2, 2 | valve accommodating bore |
| 3 | valve accommodating member |
| 4 | pressure fluid bore |
| 5 | pressure generating element |
| 6 | driving element |
| 7, 8, 9, 10, 11 | location bores |
| 12, 12' | pressure accumulator piston |
| 13 | pressure fluid bore |
| 14 | pressure fluid supply means |
| 15 | pressure fluid bore |
| 16 | channel |
| 17 | filter element |
| 18 | non-return valve |
| 19 | pressure fluid consumer |
| 20 | deviation device |
| 21, 21' | cover |
| 22 | leakage and pressure relief bore |
| 23 | sealing ring |
| 24 | damping piston |
| 25 | circlip |
| 26 | cable bushing |
| 27 | restrictor |
| 28 | projection |
| 29 | sealing plate |
| 30 | diaphragm |
| 31 | cup seal |
| 32 | stop portion |
| 33 | recess |
| 34 | chamfering |
| 35 | pressure spring |
| 36 | opening |

What is claimed is:

1. Hydraulic unit for slip-controlled brake systems including: several hydraulically, mechanically and electrically operable functional elements arranged in an accommodating member, wherein the functional elements include accumulator elements, valve elements including inlet valves and outlet valves, a pressure generating element, and driving elements; wherein said accommodating member defines several pressure fluid channels which interconnect the functional elements and which are able to provide a hydraulically operable connection between at least one pressure fluid source and a pressure fluid consumer; and a control device which can be connected to the valve elements and the driving elements by way of electrical conductors, characterized in that the valve accommodating member defines a passage for said electrical conductors for the driving elements.

2. A hydraulic unit as claimed in claim 1, wherein:
   the valve elements are arranged in several valve accommodating bores of the valve accommodating member of a first row and a second row diametrically oriented with the first row;
   between the first and second rows are provided first pressure fluid bores interconnecting the valve elements and a location bore accommodating the pressure generating element and the driving element;
   the pressure generating element is interposed between connecting planes of the valve elements and the driving element; and
   for the storing of pressure fluid, outside the two valve rows, pressure accumulator location bores, arranged perpendicularly to the valve accommodating bores, terminate into the valve accommodating member.

3. A hydraulic unit as claimed in claim 2, wherein a first portion of the location bore accommodating the pressure generating element is arranged in parallel between the first valve row and the second valve row.

4. A hydraulic unit as claimed in claim 3, wherein a second portion of the location bore accommodating the driving elements is aligned vertically and concentrically to the first portion of the location bore accommodating the pressure generating element.

5. A hydraulic unit as claimed in claim 2, wherein, for the storing of pressure fluid, one pressure accumulator piston is arranged in each of the pressure accumulator location bores and, by way of a second pressure fluid bore, has a connection with the location bore of the pressure generating element and the location bore of a first of the outlet valves, which are closed in their normal position.

6. A hydraulic unit as claimed in claim 2, further comprising a noise damper location bore for accommodating a noise damper which is arranged beside a first of the pressure accumulator location bores for said pressure accumulator piston and is connected through a third pressure fluid bore to the location bore of the pressure generating element, and wherein the third pressure fluid bore, by way of the noise damper location bore which is hermetically sealable, provides for a hydraulic connection between the delivery side of the pressure generating element and a first channel of said pressure fluid channels leading to the at least one pressure fluid source.

7. A hydraulic unit as claimed in claim 6, wherein the first channel connecting the noise damper location bore to the at least one pressure fluid source is provided with a filter element extending into the noise damper location bore and a restrictor, and wherein the first channel in the mounting position of the hydraulic unit is provided with a geodetic level difference relative to the third pressure fluid bore, which permits the venting of the noise damper location bore.

8. A hydraulic unit for slip-controlled brake systems comprising:
   at least one inlet valve;
   at least one outlet valve;
   a pressure generating element;
   a driving element for driving said pressure generating element;
   a pressure accumulator; and
   a valve accommodating member defining a plurality of pressure fluid channels which interconnect said at least one inlet valve, said at least one outlet valve, said pressure generating element, and said pressure accumulator, to provide a hydraulically operable connection between a pressure fluid source and a pressure fluid consumer, and defining a passage for an electrical conductor for controlling at least one of said driving elements, said at least one inlet valve, and said at least one outlet valve.

9. A hydraulic unit as claimed in claim 8, wherein:

said at least one inlet valve and said at least one outlet valve are arranged in several valve accommodating bores of said valve accommodating member of a first row and a second row diametrically oriented with the first row;

between the first and second rows are provided first pressure fluid bores interconnecting said at least one inlet valve and said at least one outlet valve and a location bore accommodating the pressure generating element and the driving element;

the pressure generating element is interposed between connecting planes of said at least one inlet valve and said at least one outlet valve and the driving element; and pressure accumulator location bores, arranged perpendicularly to the valve accommodating bores, terminate into the valve accommodating member.

10. A hydraulic unit as claimed in claim 9, wherein a first portion of the location bore accommodating the pressure generating element is arranged in parallel between the first valve row and the second valve row.

11. A hydraulic unit as claimed in claim 10, wherein a second portion of the location bore accommodating the driving elements is aligned vertically and concentrically to the first portion of the location bore accommodating the pressure generating element.

12. A hydraulic unit as claimed in claim 9, wherein, for the storing of pressure fluid, one pressure accumulator piston is arranged in each of the pressure accumulator location bores and, by way of a second pressure fluid bore, has a connection with the location bore of the pressure generating element and the location bore of a first of the outlet valves, which are closed in their normal position.

13. A hydraulic unit as claimed in claim 9, further comprising a noise damper location bore for accommodating a noise damper which is arranged beside a first of the pressure accumulator location bores for said pressure accumulator piston and is connected through a third pressure fluid bore to the location bore of the pressure generating element, and wherein the third pressure fluid bore, by way of the noise damper location bore which is hermetically sealable, provides for a hydraulic connection between the delivery side of the pressure generating element and a first channel of said pressure fluid channels leading to the at least one pressure fluid source.

14. A hydraulic unit as claimed in claim 13, wherein the first channel connecting the noise damper location bore to the at least one pressure fluid source is provided with a filter element extending into the noise damper location bore and a restrictor, and wherein the first channel in the mounting position of the hydraulic unit is provided with a geodetic level difference relative to the third pressure fluid bore, which permits the venting of the noise damper location bore.

15. A hydraulic unit as claimed in claim 8 further comprising a control device which can be connected to said at least one inlet valve and said at least one outlet valve and said driving elements by way of said electrical conductor.

* * * * *